US012467398B2

(12) United States Patent
Venkatesan et al.

(10) Patent No.: US 12,467,398 B2
(45) Date of Patent: Nov. 11, 2025

(54) EXHAUST GAS SENSOR ASSEMBLY

(71) Applicant: FORD GLOBAL TECHNOLOGIES, LLC, Dearborn, MI (US)

(72) Inventors: Shrevatsan Venkatesan, Canton, MI (US); William Russell Goodwin, Farmington Hills, MI (US); Arron Kowalczyk, Newport, MI (US); Lakshmana Gummadi, Northville, MI (US); Nicole Pamela Herrera Gutierrez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 760 days.

(21) Appl. No.: 17/157,063

(22) Filed: Jan. 25, 2021

(65) Prior Publication Data

US 2022/0235688 A1 Jul. 28, 2022

(51) Int. Cl.
| | |
|---|---|
| *F01N 11/00* | (2006.01) |
| *F01N 13/00* | (2010.01) |
| *G01D 11/24* | (2006.01) |
| *G01N 1/22* | (2006.01) |
| *G01N 27/407* | (2006.01) |
| *G01N 33/00* | (2006.01) |

(52) U.S. Cl.
CPC ............ *F01N 11/00* (2013.01); *F01N 13/008* (2013.01); *G01D 11/245* (2013.01); *G01N 33/0037* (2013.01); *F01N 2560/026* (2013.01); *G01N 1/2252* (2013.01); *G01N 27/4078* (2013.01); *G01N 33/0036* (2013.01)

(58) Field of Classification Search
CPC .......... G01N 33/0036; G01N 33/0037; G01N 27/4078; G01N 1/2252; G01D 11/245; F01N 2560/026
See application file for complete search history.

(56) References Cited

U.S. PATENT DOCUMENTS

| | | | |
|---|---|---|---|
| 9,932,878 | B2 | 4/2018 | Zhang |
| 10,066,535 | B2 | 9/2018 | Yi et al. |
| 10,513,961 | B2 | 12/2019 | Yoo et al. |
| 2003/0089158 | A1 | 5/2003 | Nishimoto et al. |
| 2004/0149595 | A1 | 8/2004 | Moore |
| 2007/0214862 | A1* | 9/2007 | Kubinski ............... F01N 13/18 73/1.06 |
| 2009/0260987 | A1 | 10/2009 | Valdes et al. |

(Continued)

FOREIGN PATENT DOCUMENTS

CN 206945663 U 1/2018

*Primary Examiner* — C. Sun
(74) *Attorney, Agent, or Firm* — Vincent Mastrogiacomo; Brooks Kushman P.C.

(57) ABSTRACT

An exhaust gas sensor assembly for a vehicle includes a sampling tube having a proximal end connectable to a housing and a distal end configured to be suspended with a cavity of the housing. The tube defines a hollow center, an inlet, an outlet, and an exhaust gas flow path extending from the inlet, through the hollow center, and to the outlet. An exhaust gas sensor is disposed in the hollow center at the proximal end and includes a sensing element disposed in the exhaust gas flow path. a flow guide is disposed in the hollow center between the inlet and the sensing element and is configured to redirect the flow path through a passageway defined between the tube and the flow guide.

13 Claims, 3 Drawing Sheets

(56) References Cited

U.S. PATENT DOCUMENTS

| | | | |
|---|---|---|---|
| 2016/0153814 A1* | 6/2016 | Seimori | G01N 33/0054 73/431 |
| 2017/0058748 A1* | 3/2017 | Zhang | G01N 15/0656 |
| 2018/0321125 A1* | 11/2018 | Holzknecht | G01N 27/4077 |
| 2020/0200065 A1* | 6/2020 | Holz | F01N 11/007 |

* cited by examiner

EXHAUST GAS SENSOR ASSEMBLY

TECHNICAL FIELD

This disclosure relates to gas sensors and more particularly to gas sensors used in a vehicle exhaust system.

BACKGROUND

Internal combustion engines generate exhaust gases during the combustion process. An exhaust system transports these exhaust gases from the engine to the atmosphere. The exhaust gases include many different compounds including nitrous oxide (NOx), oxygen, unburnt fuel, carbon monoxide, and carbon dioxide. Modern computer-controlled engines monitor these compounds with sensors to facilitate operation of the engine.

SUMMARY

According to one embodiment, an exhaust gas sensor assembly for a vehicle includes a sampling tube having a proximal end connectable to a housing and a distal end configured to be suspended with a cavity of the housing. The tube defines a hollow center, an inlet, an outlet, and an exhaust gas flow path extending from the inlet, through the hollow center, and to the outlet. An exhaust gas sensor is disposed in the hollow center at the proximal end and includes a sensing element disposed in the exhaust gas flow path. a flow guide is disposed in the hollow center between the inlet and the sensing element and is configured to redirect the flow path through a passageway defined between the tube and the flow guide.

According to another embodiment, a sensor assembly for a vehicle includes a sensor and a sampling tube circumscribing the sensor. The tube defines an inlet, an outlet, and a hollow center configured to route a gas from the inlet, past the sensor, and to the outlet. The tube includes a flow guide partially blocking the hollow center and cooperating with the tube to define a gap.

According to yet another embodiment, a vehicle exhaust system includes an exhaust conduit having a sidewall and a sensor assembly attached to the sidewall. The sensor assembly includes a sampling tube projecting from the sidewall towards a center of the exhaust conduit. The sampling tube defines a hollow center, an inlet to the hollow center, and an outlet from the hollow center. The sensor assembly further includes a sensor extending through the sidewall to be received within the hollow center. A flow guide is disposed in the hollow center and cooperates with the tube to define a passageway.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
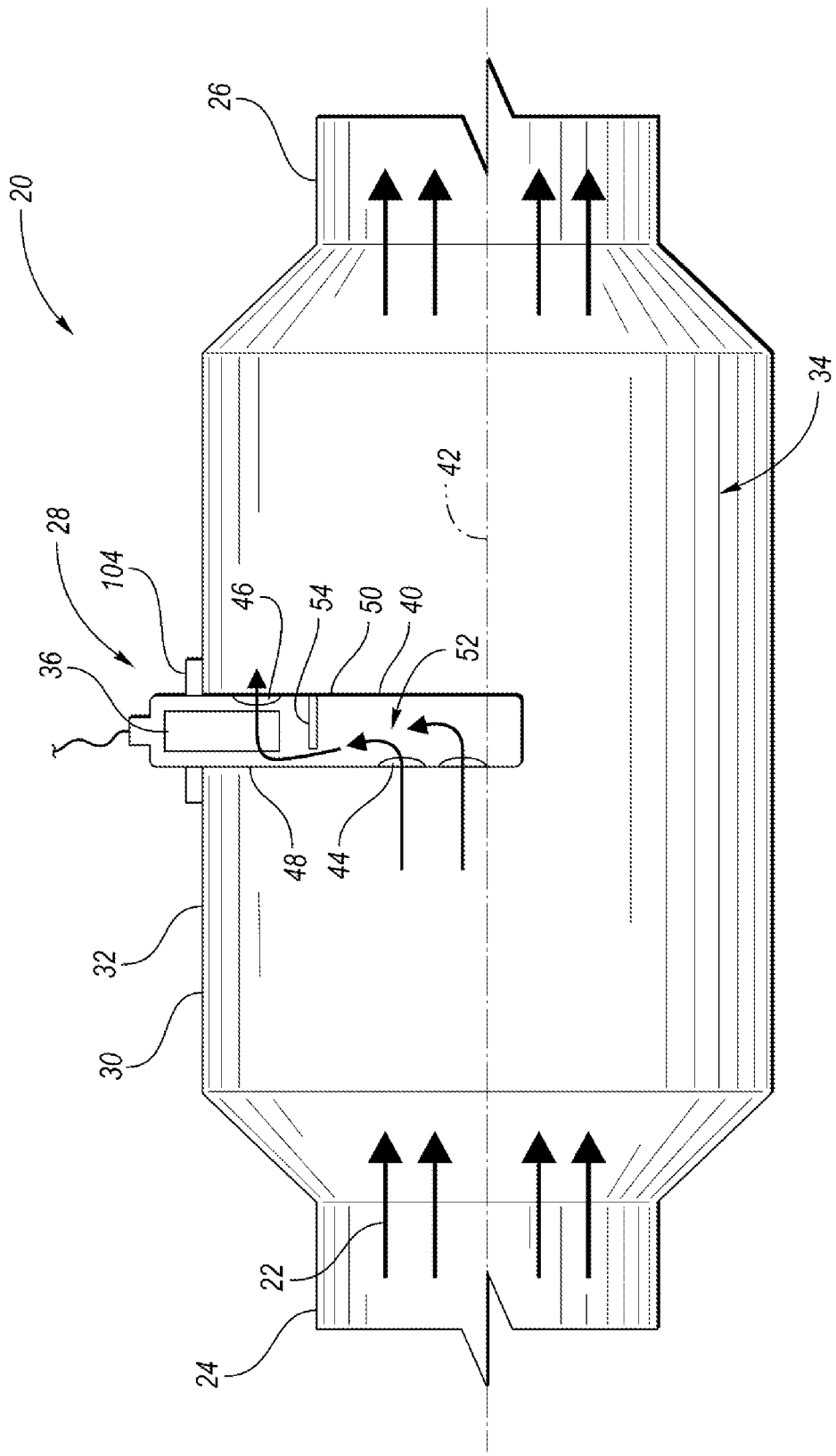
FIG. 1 illustrates a portion of an exhaust system having a gas sensor for sampling the exhaust gases.

Referring to FIG. 1, a vehicle exhaust system 20 is configured to carry an exhaust gas stream 22 from the engine to the atmosphere. The exhaust system 20 may include one or more sections of exhaust pipe, catalytic converter(s), resonator(s), muffler(s), after-treatment components, and the like. In the illustrated embodiment, a gas sensor assembly 28 is attached to an expanded housing 30 of the system 20. The housing 30 may be connected to upstream and downstream exhaust pipes 24 and 26. The housing 30 may be part of the catalytic converter, an exhaust pipe or other structure. In the illustrated embodiment, the housing 30 is the shell of the catalytic converter.

The gas sensor assembly 28 may be attached to a sidewall 32 of the housing 30. The gas sensor assembly 28 extends into an open cavity 34 of the housing 30 to be disposed within the exhaust gas stream 22. The sensor assembly 28 includes an exhaust gas sensor 36 configured to read a concentration of one or more compounds of the exhaust gas stream 22. For example, the sensor 36 may be configured to sense concentrations of nitrous oxide, oxygen, other gas, or combinations thereof.

As will be described in more detail below, the sensor assembly 28 includes a sampling tube 40 extending inwardly from the sidewall 32 towards a longitudinal centerline 42 of the housing 32. The sampling tube 40 may be arranged radially as shown in the illustrated embodiment, or may be attached at an angle. The sampling tube 40 is configured to draw the gas stream 22 located near the center portion of the cavity 34 to the sensor 36 located near the sidewall 32. The sampling tube 40 improves accuracy by routing more of the exhaust gas stream 22 to the sensor 36 than would otherwise occur without the sampling tube 40. Since the sensor 36 is disposed on the sidewall 32, it may receive less flow especially if the housing 30 is of a larger diameter. Additionally, it is possible for the exhaust stream 22 to be nonhomogeneous with differing concentrations of gases along its cross-section. If the sensor 36 is only sensing the exterior portions of the exhaust stream 22, it is possible for inaccurate readings to be produced. The sampling tube 40 includes a plurality of inlets 44 located at different radial positions of the tube. The inlets 44 are disposed on an upstream side 48 of the tube 40. The sampling tube 40 is hollow and routes the airstream entering the inlets 41 to the sensor 36. An outlet 46 which is disposed adjacent to the sensor 36 allows the exhaust gasses to exit the sampling tube 40. A sensing element of the sensor 36 senses the concentrations of the gases as it pass by. The outlet 46 is disposed on a downstream side 50 of the tube 40.

While the hollow center 52 of the sampling tube is capable of routing exhaust gases 22 to the sensor 36, testing has shown that this alone may be insufficient in certain situations. For example, it is possible for the gas stream within the sampling tube 40 to mostly bypass the sensor 36, e.g., if a majority of the flow is along the downstream inner wall of the tube 40. To solve this problem, a flow guide 54 is added to force the gas stream across the sensor 36. The flow guide 54 may be a plate or wall that covers over a portion of the hollow center and forces the gas stream up along the upstream inner wall of the tube 40. This may produce a perpendicular flow across the sensor 36 as the gas stream flows to the outlet hole 46.

Figure 2:
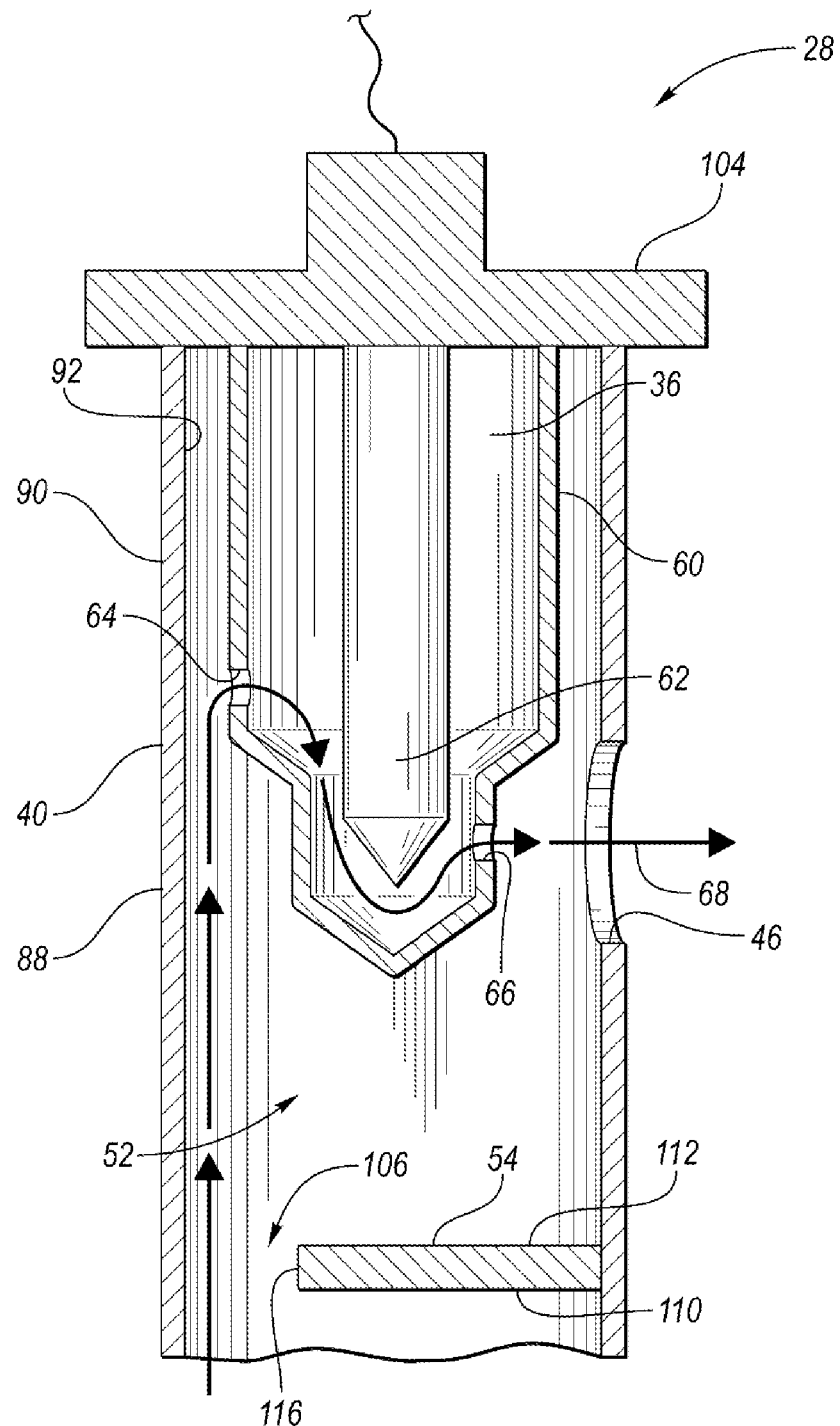
FIG. 2 illustrates a diagrammatical side view of a gas sensor assembly.

Referring to FIG. 2, the sensor 36 may be of any construction or design known in the art. At a high level, the sensor 36 may include a shell 60 and a sensing element 62 disposed within the shell. The shell 60 defines a plurality of inlet openings 64, e.g., holes. The shell 60 may be cylindrical and the holes 64 may be provided circumferentially around the cylinder. The shell 60 may also define a plurality of outlet openings 66, e.g., holes, which may also be circumferentially arranged. During operation, a portion of the gas stream 68 flows through the inlet openings 64, across the sensing element 62, and out the outlet openings 66. The sensing element 62 is configured to sense concentrations of one or more gases as the stream 68 passes by. For example, the sensing element 62 may be configured to sense nitrous oxide, oxygen, or the like. The sensor may be attached utilizing a mounting boss configuration that may be integrated into the sampling tube.

Figure 3:
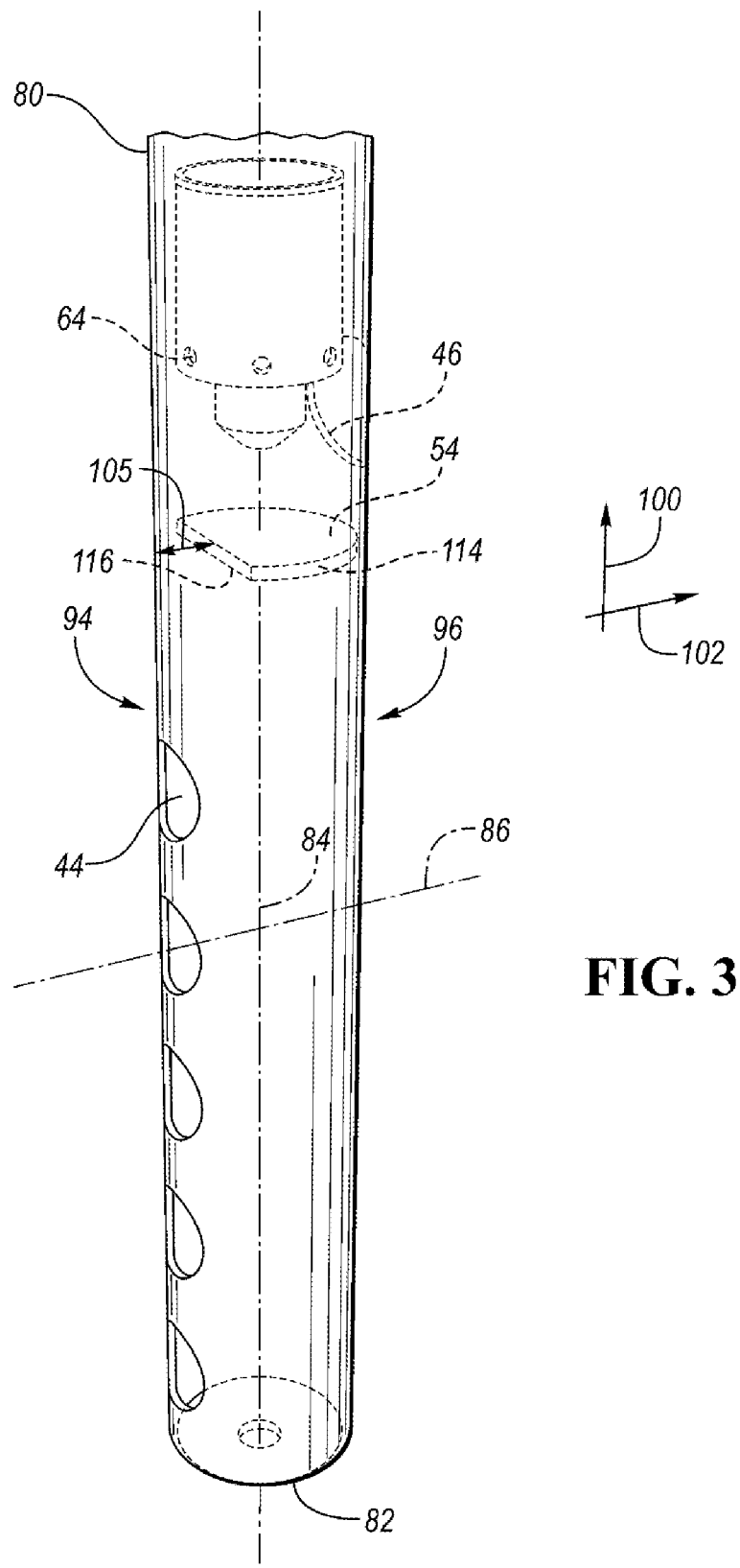
FIG. 3 illustrates another diagrammatical side view of the gas sensor assembly.

Referring to FIGS. 2 and 3, the sampling tube 40 includes a proximal end 80, a distal end 82, a longitudinal centerline 84, and a midline 86 that is perpendicular to the longitudinal centerline 84. The sampling tube 40 includes a sidewall 88, which may be a circular cylinder, that extends from the proximal end 80 to the distal end 82. The distal end 82 may be generally closed with a drain hole. An end cap may be attached to the sidewall 88 to form the distal end 82. The sidewall 88 includes an outer surface 90 and an inner surface 92. The sidewall 88 also includes an upstream side 94 that faces the gas stream 22 and a downstream side 96. The inlets 44 are located on the upstream side 96 to accept the incoming gas stream 22 into the hollow center 52. The inlets 44 are one or more openings such as holes that extend through the sidewall 88 from the exterior surface 90 to the interior surface 92. The holes may be circular, ovular, or any other shape. The inlets 44 may be arranged in a linear array along the axial direction (longitudinal direction) 100 of the sampling tube 40. The inlets 44 are in higher concentration near the distal end 82 to capture the portion of the gas stream 22 near the centerline 42 of the exhaust system. The outlet 46 is located on the downstream side 96 and generally near the distal end 80. Unlike the inlets 44, the sampling tube 40 may only include a single outlet 46. Although, in other embodiments, multiple outlets may be provided. The outlet 46 may be a hole that extends through the sidewall 88 from the outer surface 90 to the inner surface 92. The hole 46 may be circular, ovular, or any other shape.

The sensor 36 is disposed within the hollow center 52 of the sampling tube 40. For example, the sensor 36 may be received through the open distal end 80 of the sampling tube 40. This suspends the sensing element 62 within the hollow center 52. The outlet 46 is placed to be generally adjacent to the sensing element 62 of the sensor 36 to provide optimal readings. The sampling tube 40 and the sensor 36 may be attached to a head 104 of the sensor assembly 28. The head 104 may be configured to attach to the housing 32 or other fixture, e.g. a pipe sidewall. The sensor assembly 28 may include threads or other means for securing to the exhaust system 20.

To improve gas flow across the sensing element 62, a flow guide 54 is provided within the sampling tube 40. The flow guide 54 blocks a substantial portion of the hollow center 52 and forces the gas stream to flow through a passageway 106 located along the inner surface 92 of the upstream side 94. The flow guide 54 may be a separate component attached to the sampling tube 40 or may be an integrally formed portion of the sampling tube 40. In the illustrated embodiment, the flow guide 54 is a plate that is attached to the sampling tube 40 such as by welding or other means. The plate may be orthogonal to the axial direction 100. The plate could also be angled within the sampling tube 40 in other embodiments.

The flow guide 54 includes a first planar surface 110 that extends over a substantial portion of the hollow center forcing the gas flow through the narrowed passageway 106. The flow guide 54 may block at least 50% of the hollow center. In other embodiments, the flow guide 54 my block at least 60%, 70%, 80%, or 90% of the hollow center. The planar surface 110 may be oriented radially (direction 102) relative to the axial centerline 84 of the tube 40 (as shown) or may be slanted. The flow guide 54 may also include a second surface 112, which may also be a planar surface parallel to the first planar surface 110. Alternatively, second surface 112 may have a different shape or orientation than the planar surface 110. The flow guide 54 may be generally shaped as a planar disk with a portion removed to create the passageway 106. That is, the flow guide 54 may include a circumferential edge 114 that is disposed against the interior surface 92 of the sampling tube 40 at the downstream side and surrounding area, and a straight edge 116 that is spaced apart from the interior surface 92 at the upstream side and surrounding area to create a gap 105, which forms the passageway 106. The gap 105 may be located diametrically opposite to the outlet 46. The size of the gap 105 can be tuned to provide the desired gas flow to the sensor 36.

The flow guide 54 is axially positioned between the uppermost inlet 44 and the outlet 46. This may place the flow guide 54 between the midpoint 86 and the distal end 80. In the illustrated embodiment, flow guide 54 is closer to the distal end 80 than to the midpoint 86. This, however, is not required and depends upon the flow characteristics of the assembly 28.

It is to be understood that the above described flow guide 54 is merely an example and that the flow guide 54 may have any shape, size, or form that is capable of forming a restricted passageway to guide the flow near the upstream side of the sensor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An exhaust gas sensor assembly for a vehicle comprising:
 a sampling tube including a proximal end connectable to a housing and a distal end configured to be suspended with a cavity of the housing, the tube defining a hollow center, inlets vertically arranged on an upstream side of the tube, an outlet on a downstream side of the tube, and an exhaust gas flow path extending from the inlets, through the hollow center, and to the outlet;
 an exhaust gas sensor disposed in the hollow center at the proximal end, the sensor including a cylindrical shell having inlet openings and outlet openings located closer to the distal end than the inlet openings and a sensing element disposed in the shell such that the shell completely encircles the sensing element and such that the sensing element extends beyond the outlet openings, wherein the exhaust gas flow path extends through the inlet openings, across the sensing element, and out the outlet openings, wherein one of the outlet openings of the sensor and the outlet of the sampling tube are located at a same longitudinal position of the sampling tube such that a portion of the exhaust gas flow path exiting the one of the outlet openings flows directly and unimpededly out of the sampling tube through the outlet of the sampling tube due to longitudinal alignment of the one of the outlet openings and the outlet of the sampling tube; and
 a flow guide disposed in the hollow center between the inlets and the sensing element and configured to redirect the flow path through a passageway defined between the tube and the flow guide.

2. The sensor assembly of claim 1, wherein the passageway has a smaller cross-sectional area than the hollow center.

3. The sensor assembly of claim 1, wherein the flow guide includes a planar surface oriented radially relative to an axial centerline of the tube.

4. The sensor assembly of claim 1, wherein the tube includes a cylindrical sidewall extending between the proximal and distal ends, the sidewall having an upstream side defining the inlets and a downstream side defining the outlet.

5. The sensor assembly of claim 4, wherein the flow guide is disposed against the downstream side and is spaced from the upstream side to form the passageway therebetween.

6. The sensor assembly of claim 1, wherein the flow guide blocks at least 50 percent of the hollow center.

7. The sensor assembly of claim 1, wherein the flow guide is plate.

8. The sensor assembly of claim 7, wherein the plate includes a first circumferential edge disposed against the tube and a second circumferential edge spaced from the tube to define the passageway.

9. The sensor assembly of claim 1, wherein the exhaust gas sensor is configured to sense nitrous oxide.

10. A vehicle exhaust system comprising:
 an exhaust conduit having a sidewall; and
 a sensor assembly including:
  a sampling tube including a proximal end connected to the sidewall and a distal end configured to be suspended with a cavity of the exhaust conduit, the tube defining a hollow center, inlets vertically arranged on an upstream side of the tube, an outlet on a downstream side of the tube, and an exhaust gas flow path extending from the inlets, through the hollow center, and to the outlet,
  an exhaust gas sensor disposed in the hollow center at the proximal end, the sensor including a cylindrical shell having inlet openings and outlet openings located closer to the distal end than the inlet openings and a sensing element disposed in shell such that the shell completely encircles the sensing element, wherein the exhaust gas flow path extends through the inlet openings, across the sensing element, and out the outlet opening, wherein one of the outlet openings of the sensor and the outlet of the sampling tube are located at a same longitudinal position of the sampling tube such that a portion of the exhaust gas flow path exiting the one of the outlet openings flows directly and unimpededly out of the sampling tube through the outlet of the sampling tube due to longitudinal alignment of the one of the outlet openings and the outlet of the sampling tube; and
  a flow guide disposed in the hollow center between the inlets and the sensing element and configured to redirect the flow path through a passageway defined between the tube and the flow guide.

11. The vehicle exhaust system of claim 10, wherein the passageway is located on a side of the tube that is diametrically opposite from the outlet.

12. The vehicle exhaust system of claim 11, wherein the passageway has a smaller cross-sectional area than the hollow center.

13. The vehicle exhaust system of claim 11, wherein the flow guide is a plate that is oriented orthogonal to a longitudinal axis of the tube, and wherein a portion of the plate is spaced from an interior wall of the tube to define the passageway.

* * * * *